United States Patent
Hornblower et al.

(10) Patent No.: US 10,995,604 B2
(45) Date of Patent: May 4, 2021

(54) CLOSED LOOP CONTROL OF DRILLING CURVATURE

(71) Applicant: Schlumberger Technology Corporation, Sugar Land, TX (US)

(72) Inventors: Peter Hornblower, Quedgeley (GB); Steven David Hough, Stonehouse (GB); Maja Ignova, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 249 days.

(21) Appl. No.: 15/780,254

(22) PCT Filed: Nov. 30, 2016

(86) PCT No.: PCT/US2016/064271
§ 371 (c)(1),
(2) Date: May 31, 2018

(87) PCT Pub. No.: WO2017/095959
PCT Pub. Date: Jun. 8, 2017

(65) Prior Publication Data
US 2018/0363444 A1 Dec. 20, 2018

Related U.S. Application Data

(60) Provisional application No. 62/261,461, filed on Dec. 1, 2015.

(51) Int. Cl.
*E21B 44/02* (2006.01)
*E21B 45/00* (2006.01)
(Continued)

(52) U.S. Cl.
CPC ............... *E21B 44/02* (2013.01); *E21B 7/04* (2013.01); *E21B 7/06* (2013.01); *E21B 21/08* (2013.01);
(Continued)

(58) Field of Classification Search
CPC . E21B 44/02; E21B 7/06; E21B 44/00; E21B 7/04; E21B 21/08; E21B 47/024; E21B 45/00; G05B 2219/45129
See application file for complete search history.

(56) References Cited

U.S. PATENT DOCUMENTS 7,136,795 B2   11/2006   Downton
8,676,558 B2   3/2014    Pirovolou
(Continued)

FOREIGN PATENT DOCUMENTS

CN   103790579 A   5/2014
CN   105041212 A   11/2015
(Continued)

OTHER PUBLICATIONS

International Preliminary Report on Patentability issued in International Patent application PCT/US2016/064271 dated Jun. 14, 2018, 10 pages.
(Continued)

*Primary Examiner* — Christopher E. Everett

(57) ABSTRACT

A downhole closed loop method for controlling a curvature of a subterranean wellbore while drilling includes controlling a direction of drilling such that the drilling attitude is substantially equal to a setpoint attitude. A setpoint rate of penetration is processed in combination with a setpoint dogleg severity to compute a setpoint attitude increment. The setpoint attitude may be adjusted by the setpoint attitude
(Continued)

increment. The setpoint attitude may be incremented at some interval to control the curvature of the wellbore while drilling.

11 Claims, 5 Drawing Sheets

(51) Int. Cl.
*E21B 7/06* (2006.01)
*E21B 44/00* (2006.01)
*E21B 7/04* (2006.01)
*E21B 21/08* (2006.01)
*E21B 47/024* (2006.01)

(52) U.S. Cl.
CPC ............... *E21B 44/00* (2013.01); *E21B 45/00* (2013.01); *E21B 47/024* (2013.01); *G05B 2219/45129* (2013.01)

(56) References Cited

U.S. PATENT DOCUMENTS

| | | | |
|---|---|---|---|
| 8,783,382 | B2 | 7/2014 | Ignova et al. |
| 8,838,426 | B2 | 9/2014 | Aldred et al. |
| 9,850,712 | B2 * | 12/2017 | Sugiura ................ E21B 44/005 |
| 9,945,222 | B2 | 4/2018 | Sugiura et al. |
| 2009/0090555 | A1 * | 4/2009 | Boone .................... E21B 44/02 |
| | | | 175/45 |
| 2010/0096186 | A1 * | 4/2010 | Ekseth ..................... E21B 7/10 |
| | | | 175/45 |
| 2010/0185395 | A1 * | 7/2010 | Pirovolou ................ E21B 7/04 |
| | | | 702/9 |
| 2012/0046868 | A1 | 2/2012 | Tchakarov et al. |
| 2013/0032401 | A1 * | 2/2013 | Edbury ................... E21B 21/01 |
| | | | 175/24 |
| 2013/0126239 | A1 | 5/2013 | Hornblower et al. |
| 2014/0129148 | A1 | 5/2014 | Harmer et al. |
| 2014/0151121 | A1 | 6/2014 | Boone et al. |
| 2014/0196950 | A1 * | 7/2014 | Bayliss .................... E21B 7/04 |
| | | | 175/27 |
| 2015/0218887 | A1 | 8/2015 | Bayliss et al. |
| 2015/0275646 | A1 | 10/2015 | Benson et al. |
| 2015/0377004 | A1 | 12/2015 | Hornblower et al. |

FOREIGN PATENT DOCUMENTS

| | | |
|---|---|---|
| WO | 2009039448 A2 | 3/2009 |
| WO | 2014074652 A1 | 5/2014 |
| WO | WO2014160567 A1 | 10/2014 |

OTHER PUBLICATIONS

International Search Report and Written Opinion issued in International Patent application PCT/US2016/064271 dated Feb. 28, 2017. 13 pages.

Matheus et al., A Hybrid Approach to Closed-loop Directional Drilling Control using Rotary Steerable Systems, IFAC Proceedings of the 2012 IFAC Workshop on Automatic Control in Offshore Oil and Gas Production, May 31-Jun. 1, 2012. Trondheim, Norway. pp. 84-89.

First Office Action and Search Report issued in Chinese patent application dated Aug. 26, 2019, 22 pages.

Second Office Action issued in Chinese Patent Application No. 201680069535.1, dated Jul. 10, 2020, 11 pages (including translation). X.

Notification of Allowance in Chinese Patent Application No. 201680069535.1, dated Mar. 3, 2021, 6 pages.

* cited by examiner

CLOSED LOOP CONTROL OF DRILLING CURVATURE

CROSS REFERENCE TO RELATED APPLICATION

This application is a U.S. national stage entry of International Patent Application No. PCT/US2016/064271, filed Nov. 30, 2016, which application claims priority to and the benefit of U.S. Provisional Patent Application No. 62/261,461, filed on Dec. 1, 2015, the entirety of which is incorporated herein by reference.

BACKGROUND

The use of automated drilling methods is becoming increasingly common in drilling subterranean wellbores. Such methods may be employed, for example, to control the direction of drilling based on various downhole feedback measurements, such as inclination and azimuth measurements made while drilling or logging while drilling measurements.

Closed loop automated drilling methods for steering a wellbore along a predetermined attitude (i.e., in a predetermined straight line direction) are sometimes referred to in the art as inclination azimuth hold routines and may be used to steer the wellbore along a prescribed inclination and azimuth. While these methods are commonly utilized there are no known automated drilling methods for directly controlling the drilling direction along a predetermined curved path (i.e., controlling the curvature of dogleg severity of the wellbore).

Wellbore curvature may be controlled indirectly by alternating between steering and non-steering modes. However, such methods may be prone to error as the wellbore curvature is not directly controlled and they don't account for formation effects. Improved automated steering methods are desired that provide for direct control of the wellbore curvature.

SUMMARY

A downhole closed loop method for controlling a curvature of a subterranean wellbore while drilling. The method includes using a drilling tool to drill the wellbore. The rate and direction of drilling may be controlled such that the rate of drilling is substantially equal to a setpoint rate of penetration and the drilling attitude is substantially equal to a setpoint attitude. The setpoint rate of penetration is processed in combination with a setpoint dogleg severity to compute a setpoint attitude increment. The setpoint attitude may be adjusted by the setpoint attitude increment. The setpoint attitude may be incremented at some interval to control the curvature of the wellbore while drilling.

In another drilling embodiment, the direction of drilling is controlled such that that a drilling attitude is substantially equal to a setpoint attitude. The rate of penetration is measured while drilling and processed in combination with a setpoint dogleg severity to compute a setpoint attitude increment. The setpoint attitude may be adjusted by the setpoint attitude increment. The setpoint attitude may be incremented at some interval to control the curvature of the wellbore while drilling.

The disclosed embodiments may provide various technical advantages. For example, the disclosed embodiments provide for real-time closed loop control of the wellbore curvature along a predetermined curved path. As such, the disclosed methods may provide for improved well placement and reduced wellbore tortuosity. Moreover, by providing for closed loop control, the disclosed methods tend to improve drilling efficiency and consistency.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 7A depicts a plot of the segmented ROP values versus time while FIG. 7B depicts a plot of the segmented ROP values versus change in measured depth.

DETAILED DESCRIPTION

Figure 1:
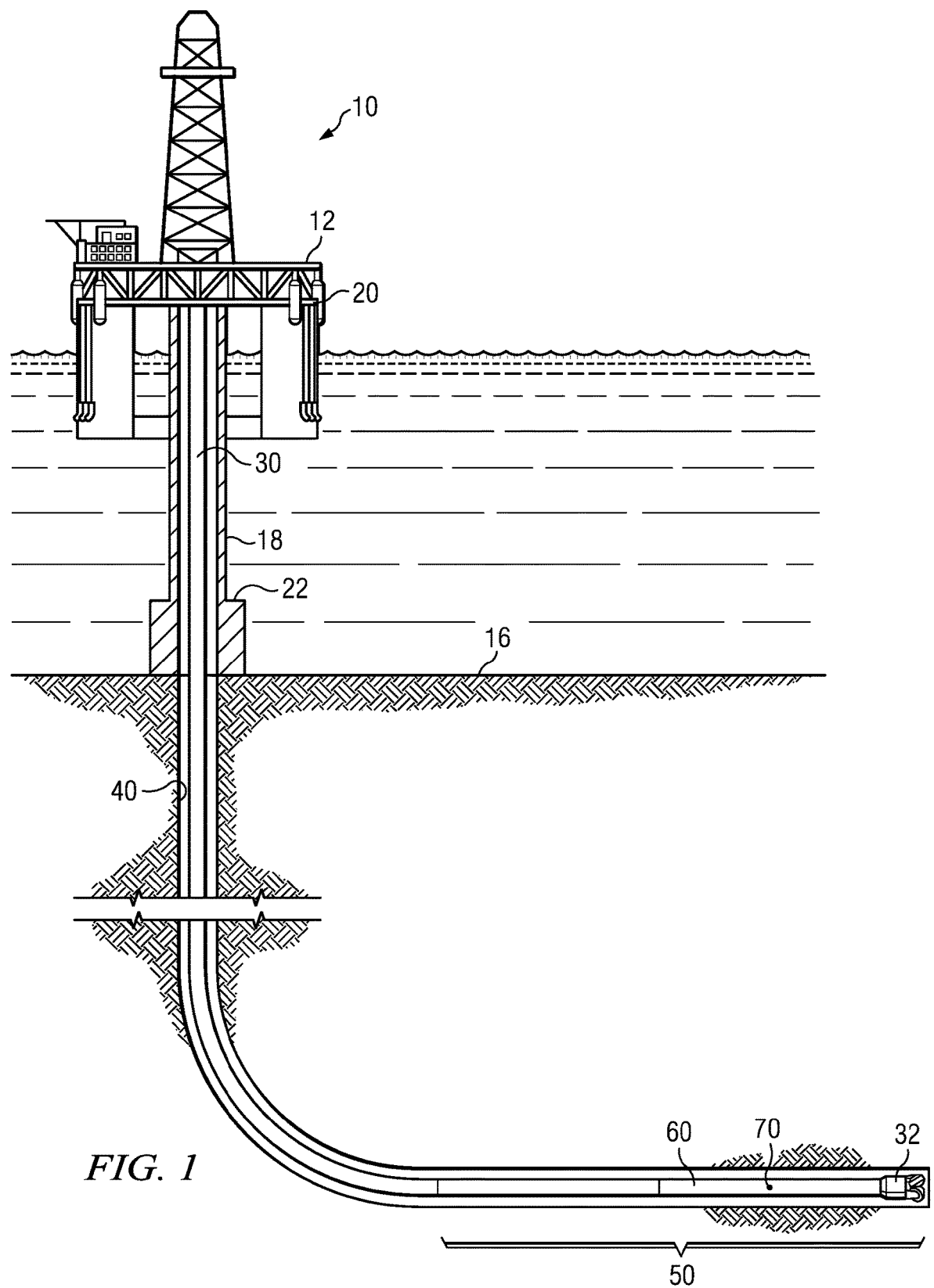
FIG. 1 depicts an example drilling rig on which disclosed embodiments may be utilized.

FIG. 1 depicts a drilling rig 10 suitable for using various method and system embodiments disclosed herein. A semi-submersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus (not shown) for raising and lowering a drill string 30, which, as shown, extends into borehole 40 and includes a bottom hole assembly (BHA) 50. The BHA 50 includes a drill bit 32, a steering tool 60 (also referred to as a directional drilling tool), and one or more downhole navigation sensors 70 such as measurement while drilling sensors including three axis accelerometers and/or three axis magnetometers. The BHA 50 may further include substantially any other suitable downhole tools such as a downhole drilling motor, a downhole telemetry system, a reaming tool, and the like. The disclosed embodiments are not limited in regards to such other tools.

It will be understood that the BHA may include substantially any suitable steering tool 60, for example, including a rotary steerable tool. Various rotary steerable tool configurations are known in the art including various steering mechanisms for controlling the direction of drilling. For example, the PathMaker® rotary steerable system (available from PathFinder® a Schlumberger Company), the AutoTrak® rotary steerable system (available from Baker Hughes), and the GeoPilot rotary steerable system (available from Halliburton) include a substantially non-rotating outer housing employing blades that engage the borehole wall. Engagement of the blades with the borehole wall is intended to eccenter the tool body, thereby pointing or pushing the drill bit in a desired direction while drilling. A rotating shaft deployed in the outer housing transfers rotary power and axial weight-on-bit to the drill bit during drilling. Accelerometer and magnetometer sets may be deployed in the outer housing and therefore are non-rotating or rotate slowly with respect to the borehole wall.

The PowerDrive rotary steerable systems (available from Schlumberger) fully rotate with the drill string (i.e., the outer housing rotates with the drill string). The PowerDrive Xceed makes use of an internal steering mechanism that does not require contact with the borehole wall and enables the tool body to fully rotate with the drill string. The PowerDrive X5, X6, and Orbit rotary steerable systems make use of mud actuated blades (or pads) that contact the borehole wall. The extension of the blades (or pads) is rapidly and continually adjusted as the system rotates in the borehole. The PowerDrive Archer® makes use of a lower steering section joined at an articulated swivel with an upper section. The swivel is actively tilted via pistons so as to change the angle of the lower section with respect to the upper section and maintain a desired drilling direction as the bottom hole assembly rotates in the borehole. Accelerometer and magnetometer sets may rotate with the drill string or may be deployed in an internal roll-stabilized housing such that they remain substantially stationary (in a bias phase) or rotate slowly with respect to the borehole (in a neutral phase). To drill a desired curvature, the bias phase and neutral phase are alternated during drilling at a predetermined ratio (referred to as the steering ratio). Again, the disclosed embodiments are not limited to use with any particular steering tool configuration.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
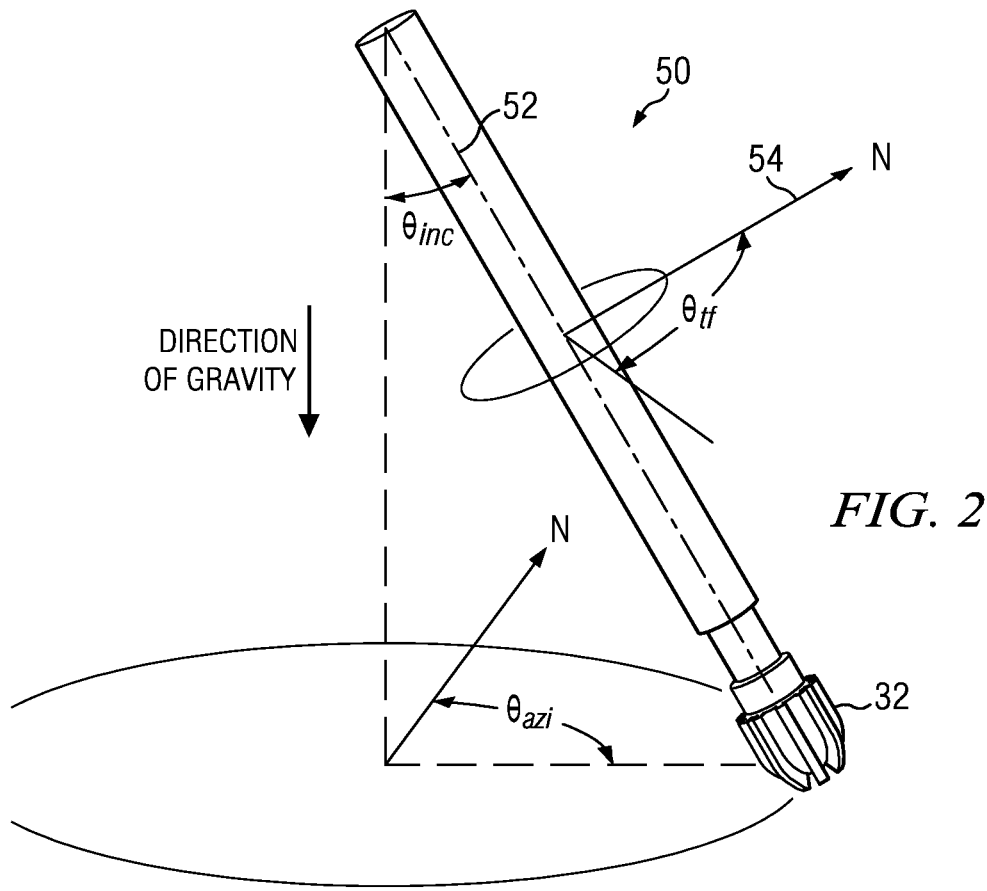
FIG. 2 depicts a diagram of attitude and steering parameters in a global coordinate reference frame.

FIG. 2 depicts a diagram of attitude and steering parameters in a global coordinate reference frame. The BHA 50 has an "attitude" defined by the BHA axis 52. The attitude is the direction of propagation of the drill bit 32 and may be represented by a unit vector, the global direction of which can be defined by the borehole inclination $\theta_{inc}$ and the borehole azimuth $\theta_{azi}$. A tool face angle $\theta_{tf}$ of a sensor or other BHA component may be defined, for example, with respect to a high side of the BHA 54. The disclosed embodiments are in no way limited by the conventions illustrated in FIG. 2.

Figure 3:
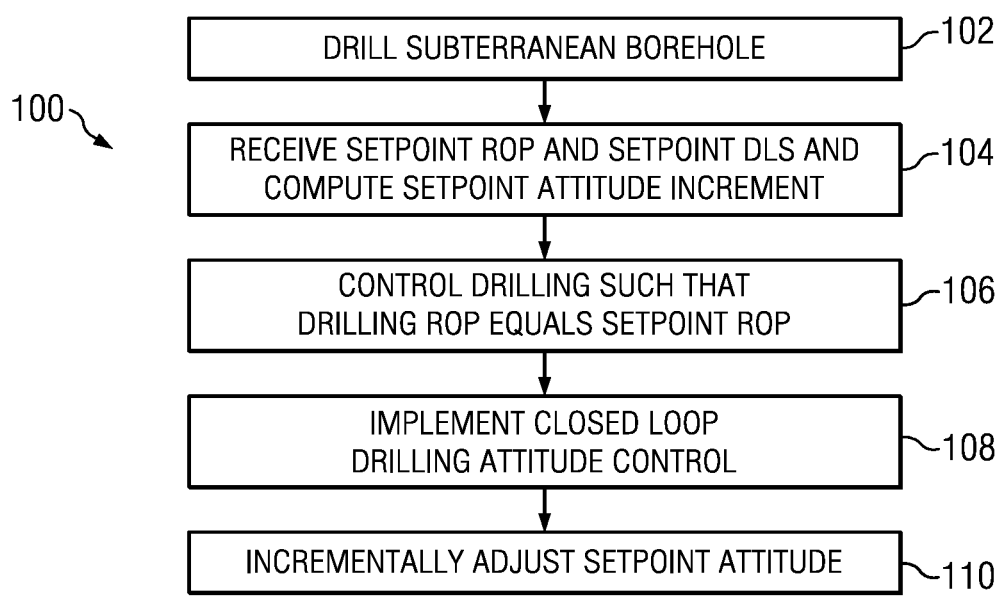
FIG. 3 depicts a flow chart of one example method for automatically drilling a curved section of a subterranean wellbore.

FIG. 3 depicts a flow chart of one example method 100 for automatically drilling a curved section of a subterranean wellbore. A drill string including a directional drilling tool (such as a rotary steerable tool) is used to drill a subterranean wellbore at 102. Set point rate of penetration (ROP) and dogleg severity (DLS) values are received at 104 and processed to compute a setpoint attitude increment (e.g., a time interval for adjusting the setpoint attitude by some predetermined amount). The ROP of drilling may be controlled such that it is substantially equal to the set point rate of penetration (i.e., within predetermined limits) at 106. A closed loop drilling attitude control methodology is implemented at 108 to hold the drilling attitude (e.g., the inclination and azimuth) at a setpoint attitude (i.e., along a predetermined direction) while drilling in 106. The setpoint attitude is then incrementally adjusted at 110 according to the computed setpoint attitude increment computed in 104 to drill the curved section.

The setpoint attitude increment computed in 104 may include an attitude change and a time increment. For example, the attitude change may be one degree of curvature and the time increment may be selected based on the set point DLS (with the time increment increasing with decreasing set point DLS). The setpoint attitude increment may also be expressed as a rate, for example, in units of degrees per time and may be computed by multiplying the setpoint ROP by the setpoint DLS. For example, in an embodiment in which the setpoint ROP is 100 feet per hour and the setpoint DLS is 10 degrees per 100 feet of measured depth, the setpoint attitude increment may be expressed as a rate of 1 degree per six minutes. Thus the setpoint attitude may be adjusted in one degree increments every six minutes at 110 (or half degree increments every 3 minutes, or two degree increments every 12 minutes, etc.).

The drilling ROP may be controlled using substantially any suitable methodology, for example, using known automated drilling software algorithms to set the surface ROP. The drilling ROP may be controlled within predetermined limits, for example, within plus or minus 10 feet per hour (such that a target ROP of 100 feet per hour yields a controlled ROP in a range from about 90 to about 110 feet per hour). Various drilling parameters, such as drilling string rotation rate, drilling fluid flow rate, and weight on bit may be adjusted using means known to those of ordinary skill to control the drilling ROP.

Figure 4:
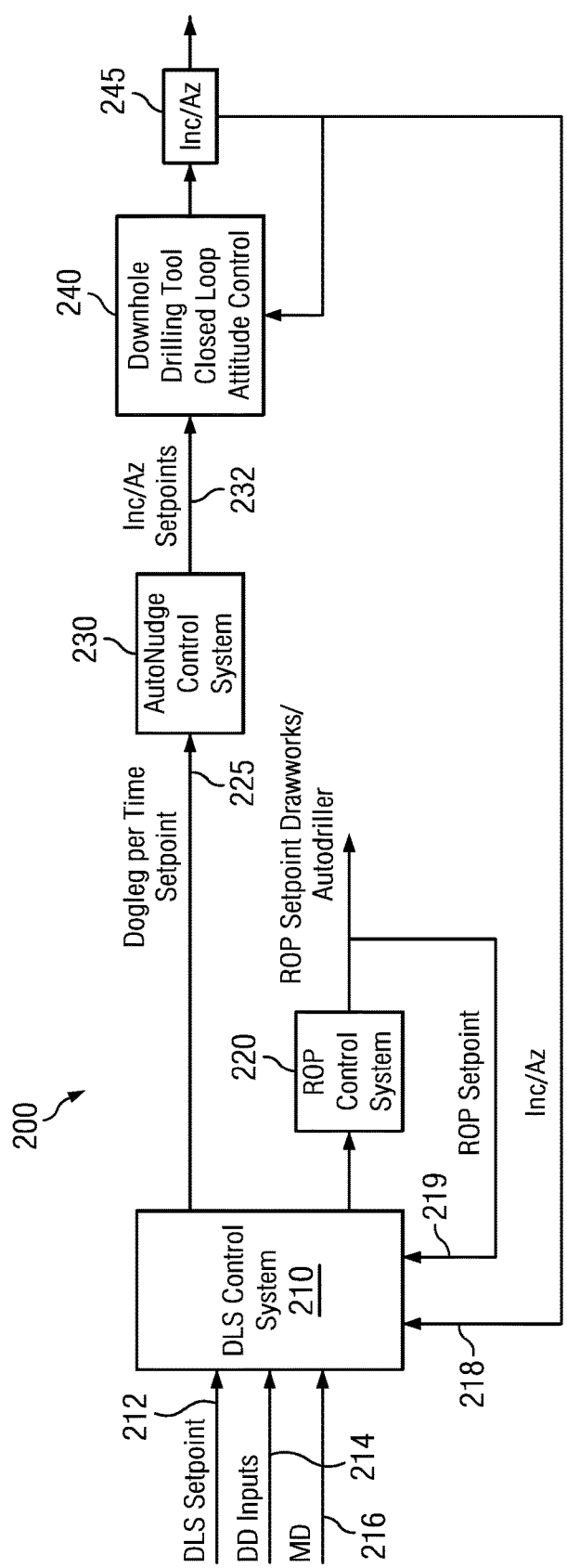
FIG. 4 depicts a block diagram of an embodiment in which a surface control system controls both the drilling tool and the drilling ROP.

FIG. 4 depicts a block diagram of an embodiment 200 in which a surface control system communicates with both the drilling tool and a surface ROP controller. A DLS control system 210 receives the DLS setpoint at 212, a measured depth at 216, and other inputs from the directional driller at 216 as well an ROP setpoint 219 from an ROP control system 220 and the wellbore attitude (inclination and azimuth in this example) 218 from the directional drilling tool (e.g., via telemetry uplink). The DLS control system 210 outputs a setpoint ROP to control system 220 which is coupled with a rig control system (e.g., a draw works or automated driller control system). The DLS control system 210 further outputs the setpoint attitude increment (e.g., as a rate as described above) which in turn may be downlinked at 225 to a DLS incrementing controller 230 in the directional drilling tool. The controller 230 increments the setpoint attitude 232 at a computed or predetermined time interval. The setpoint attitude is received by closed loop attitude controller 240 which controls the direction of drilling along the setpoint attitude using inclination and azimuth measurements obtained at 245 (e.g., using sensors 70 in FIG. 1). It will be understood that incrementing the setpoint attitude as described above controls the direction of drilling along the setpoint DLS (along the desired curve).

With further reference to FIG. 4, the DLS control system 210 may continuously monitor the ROP against predetermined limits. When the ROP exceeds those limits (either on the high side or low side) the setpoint attitude increment may be recomputed and downlinked to controller 230. Alternatively (and/or additionally), the various drilling parameters may be adjusted to return the ROP to the desired range. In other embodiments, the ROP value may be downlinked to controller 230 where the setpoint attitude increment may be recomputed at the downhole controller.

Figure 5:
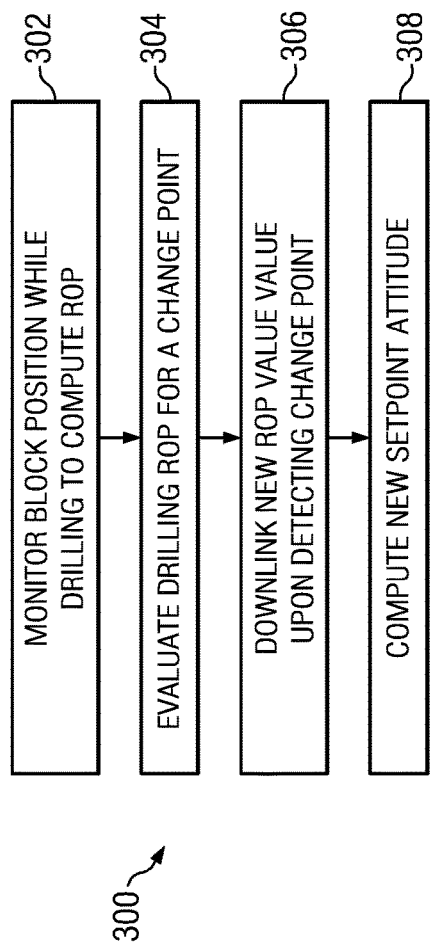
FIG. 5 depicts a block diagram of an embodiment in which a segmentation (change point) algorithm (or other suitable algorithm) may be used to monitor changes in the drilling ROP.

FIG. 5 depicts a block diagram of an embodiment 300 in which a change point algorithm (or other suitable algorithm) may be used to monitor changes in the drilling ROP. A change point algorithm may also be referred to as a segmentation algorithm. U.S. Pat. No. 8,838,426, which is incorporated by reference in its entirety herein, discloses one suitable example of a change point algorithm.

With continued reference to FIG. 5, the block position 302 may be monitored with time to compute a real-time drilling ROP. Those of ordinary skill will readily appreciate that the ROP may be defined, for example, as the change in block position per unit time (in other words the rate of change of the block position). The drilling ROP is evaluated at 304 using the segmentation algorithm to determine whether or not a change point has been detected. Upon detecting a change point, a new drilling ROP value may be downlinked to the directional drilling tool at 306 (e.g., to the incrementing controller 230 in FIG. 4). A new setpoint attitude may then be computed at 308 and output to the closed loop attitude controller 240 (FIG. 4).

Figure 6:
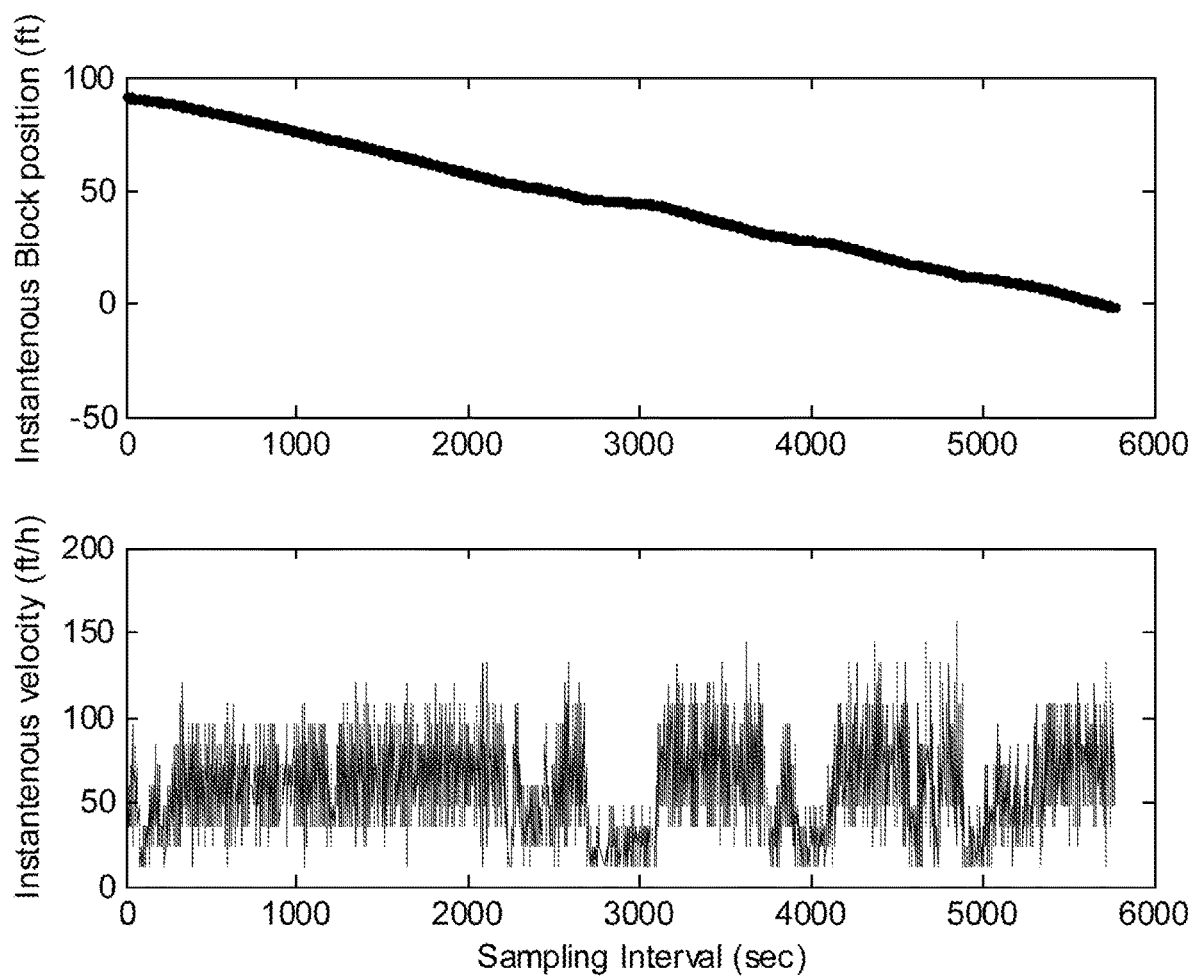
FIG. 6 depicts example plots of instantaneous block position and instantaneous drilling ROP as a function of time.

FIG. 6 depicts example plots of instantaneous block position (in units of feet) and instantaneous drilling ROP (in units of feet per hour) as a function of time (in units of seconds). It will be understood that the instantaneous drilling ROP values may be obtained by differentiating the instantaneous block position. As depicted, the instantaneous drilling ROP values tend to be noisy. The noise level in either the block position channel or the drilling ROP channel may be used as an input in the change point algorithm. In general a smaller noise level enables the detection of more ROP change points than a large noise level.

Figure 7A:
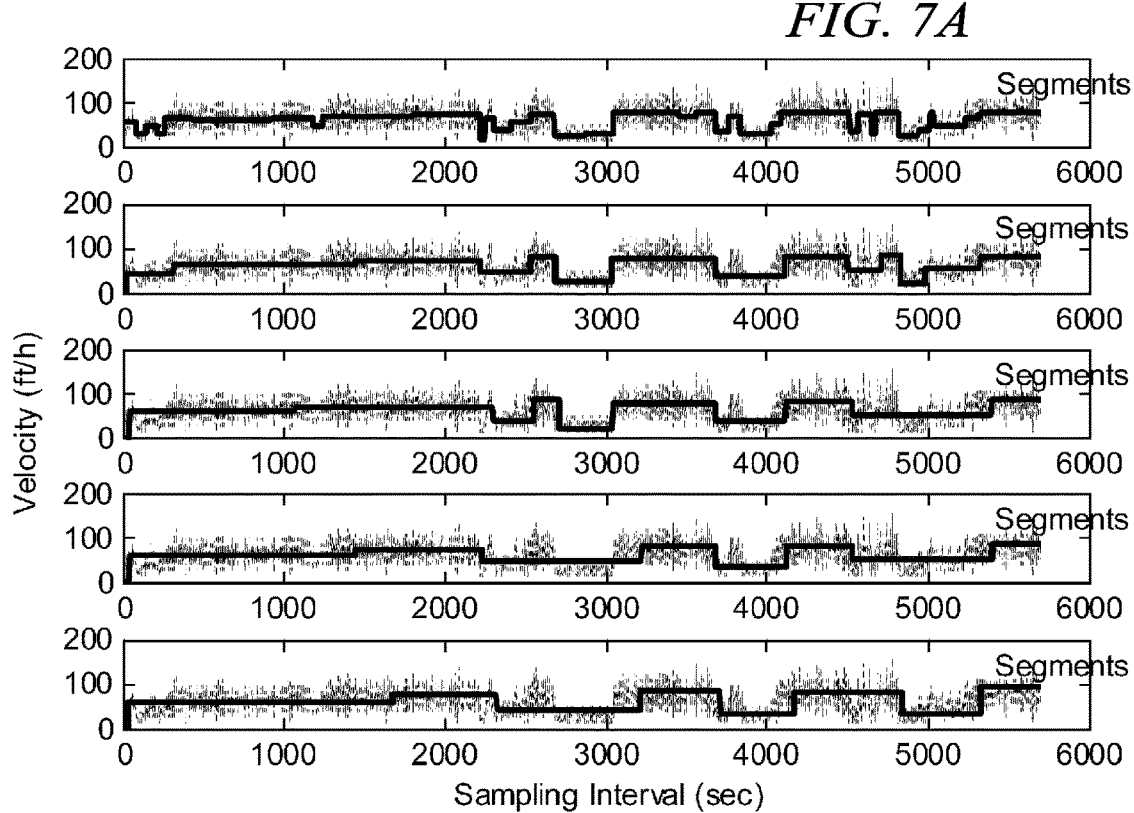
FIGS. 7A and 7B depict plots of the segmented ROP values versus time for several different input noise levels for the example shown on FIG. 6.
Figure 7B:
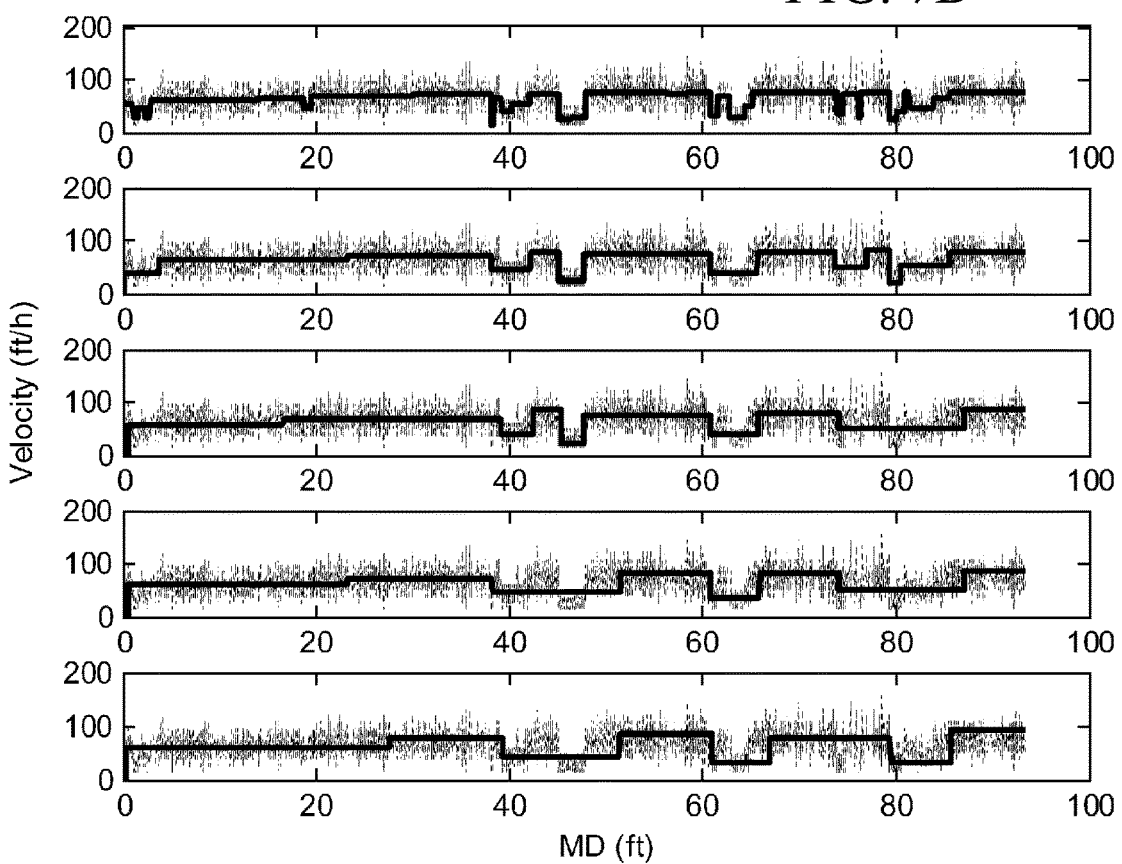

FIGS. 7A and 7B depict plots of the segmented ROP values versus time for several different input noise levels. FIG. 7A depicts a plot of the segmented ROP values versus time while FIG. 7B depicts a plot of the segmented ROP values versus change in measured depth (during a stand). The input block position noise levels were (i) 0.1 feet, (ii) 1 foot, (iii) 2 feet, (iv) 3 feet, and (v) 5 feet (plotted top to bottom). As depicted, the number of change points (changes in ROP) decreased with increasing noise.

It will be understood that the disclosed automated drilling methodology may be advantageously utilized in combination with a rig state detection algorithm. One suitable rig state detection algorithm is disclosed in commonly assigned U.S. Patent Publication 2014/0129148, which is incorporated by reference in its entirety herein. The rig state detection algorithm processes downhole sensor measurements (such as accelerometer and magnetometer measurements) to determine the drilling state of the BHA. The states may include, for example, rotary drilling, slide drilling, in slips, reaming, running in while pumping, running in while rotating, running in, tripping out, back reaming, pulling up while pumping, pulling up while rotating, pulling up, rotating off bottom, pumping off bottom, rotating and pumping off bottom, and stationary.

Disclosed embodiments of the automated drilling methodology may be configured to respond to the rig state. For example, the rig state detection algorithm may detect drilling states in which the drill bit is off bottom or otherwise not drilling forward at the setpoint ROP (e.g., when in slips and a new pipe stand is being coupled with the drill string). When such a state is detected, incrementing the setpoint attitude (e.g., at 110 of FIG. 3) may be temporarily suspended until drilling is resumed. The disclosed embodiments may also include evaluating the rig state at the surface and downlinking state information when not drilling forward at the ROP.

It will be appreciated that the measured inclination and azimuth values (the measured attitude) may be transmitted to the surface while drilling. The measured attitude may be displayed at the surface and compared with the intended well plan to monitor drilling progress.

The disclosed methodology may also include resetting the setpoint attitude (setpoint inclination and setpoint azimuth) and resetting the incrementing timer to restart drilling control of the curved section. For example, when drilling has been suspended (e.g., when adding a new pipe stand to the drill string) the control methodology may be reset (or restarted). Upon resuming drilling the attitude may be measured and the initial setpoint azimuth set to the measured value. The timer may then be restarted and the setpoint attitude increments resumed. The methodology may also be reset following a period of slower than expected drilling (lower than expected ROP values).

With reference again to FIGS. 3-5, the disclosed method embodiments may optionally employ a surface ROP prediction module configured to account for setpoint attitude increment errors caused by an incorrect ROP. The ROP prediction module may compute an historic average ROP (over some predetermined time interval) and a modelled future ROP based on the historic ROP values and the employed drilling parameters. Adjustments to the setpoint attitude increment may then be computed and downlinked to achieve the setpoint DLS.

The methods described herein may be configured for implementation via one or more controllers deployed downhole (e.g., in a steering/directional drilling tool). A suitable controller may include, for example, a programmable processor, such as a microprocessor or a microcontroller and processor-readable or computer-readable program code embodying logic. A suitable processor may be utilized, for example, to execute the method embodiments (or various steps in the method embodiments) described above with respect to FIGS. 3, 4, and 5. A suitable controller may also optionally include other controllable components, such as sensors (e.g., a depth sensor), data storage devices, power supplies, timers, and the like. The controller may also be disposed to be in electronic communication with the attitude sensors (e.g., to receive the continuous inclination and azimuth measurements). A suitable controller may also optionally communicate with other instruments in the drill string, such as, for example, telemetry systems that communicate with the surface. In some embodiments, the controller may be located partially or entirely at the surface and configured to process data sent to the surface via any suitable telemetry or data link. Wired drill pipe is one example of a high-speed downhole telemetry system that enables high-speed two-way communications. A suitable controller may further optionally include volatile or non-volatile memory or a data storage device.

Although automated steering control of dogleg sections and certain advantages thereof have been described in detail, it should be understood that various changes, substitutions and alterations may be made herein without departing from the spirit and scope of the disclosure as defined by the appended claims. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Further, it should be understood that any directions or reference frames in the preceding description are merely relative directions or movements. For example, any references to "up" and "down" or "above" or "below" are merely descriptive of the relative position or movement of the related elements.

Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

We claim:

1. A downhole closed loop method for controlling a curvature of a subterranean wellbore while drilling, the method comprising:
   (a) deploying a drill string in the subterranean wellbore, the drill string including a drill bit and a directional drilling tool deployed thereon;
   (b) rotating the directional drilling tool and the drill bit;
   (c) using the rotating directional drilling tool and the drill bit in drilling the subterranean wellbore at a rate of penetration;
   (d) controlling the directional drilling tool while drilling in (c) such that a drilling attitude is substantially equal to a setpoint attitude;
   (e) computing a setpoint attitude increment by using the rate of penetration and a setpoint dogleg severity, the setpoint attitude increment including a time interval for adjusting the setpoint attitude by a determined attitude increment;
   (f) adjusting the setpoint attitude by the setpoint attitude increment; and
   (g) continually repeating (d) and (f) to control the curvature of the wellbore while drilling in (c).

2. The method of claim 1, wherein the setpoint attitude increment comprises a rate of change of attitude per time.

3. The method of claim 1, wherein (c) comprises:
   (i) adjusting at least one of a rotation rate of the drill string, a drilling fluid flow rate, or a weight on the drill bit when the rate of penetration is outside a desired rate of penetration.

4. The method of claim 1, further comprising:
   (h) monitoring the rate of penetration in (c) against predetermined rate of penetration limits;
   (i) changing the rate of penetration when the rate of penetration monitored in (h) is outside the predetermined limits; and
   (j) repeating (e) to compute a new setpoint attitude increment.

5. The method of claim 1, further comprising:
   (h) measuring a block position in (c) to compute the rate of penetration;
   (i) evaluating the rate of penetration computed in (h) for a change point;
   (j) changing the rate of penetration when a change point is detected in (i); and
   (k) repeating (e) to compute a new setpoint attitude increment.

6. A downhole closed loop method for controlling a curvature of a subterranean wellbore while drilling, the method comprising:
   (a) deploying a drill string in the subterranean wellbore, the drill string including a drill bit and a directional drilling tool deployed thereon;
   (b) rotating the directional drilling tool and the drill bit to drill the subterranean wellbore;
   (c) controlling a direction of drilling in (b) such that a drilling attitude is substantially equal to a setpoint attitude;
   (d) measuring a rate of drilling while drilling in (b), which includes:
      (i) evaluating an instantaneous rate of drilling for a change point; and
      (ii) downlinking an average rate of drilling downhole when a change point is detected in (i);
   (e) processing the rate of drilling measured in (d) and a setpoint dogleg severity to compute a setpoint attitude increment;
   (f) adjusting the setpoint attitude by the setpoint attitude increment; and
   (g) continually repeating (d), (e), and (f) to control the curvature of the wellbore at the setpoint dogleg severity while drilling in (b).

7. The method of claim 6, wherein (d) comprises measuring an instantaneous rate of drilling by differentiating a block position with time.

8. The method of claim 6, wherein (e) further comprises processing the average rate of drilling and a setpoint dogleg severity at a downhole processor to compute the setpoint attitude increment.

9. The method of claim 6, wherein the repeating in (g) comprises:
   (i) measuring an instantaneous rate of drilling by differentiating a block position with time;
   (ii) evaluating the instantaneous rate of drilling for a change point;
   (iii) downlinking the average rate of drilling downhole when a change point is detected in (g)(ii);
   (iv) processing the average rate of drilling and the setpoint dogleg severity to compute a new setpoint attitude increment; and
   (v) adjusting the setpoint attitude by the new setpoint attitude increment.

10. The method of claim 6, wherein the setpoint attitude increment comprises a rate of change of attitude per time.

11. A method for controlling a curvature of a subterranean wellbore while drilling, the method comprising:

(a) deploying a drill string in the subterranean wellbore, the drill string including a drill bit and a directional drilling tool deployed thereon;
(b) rotating the directional drilling tool and the drill bit to drill the subterranean wellbore;
(c) causing a surface controller to control a rate of drilling in (b) such that the rate of drilling is within predetermined limits of a setpoint rate of penetration;
(d) processing the setpoint rate of penetration and a setpoint dogleg severity at the surface controller to compute a setpoint attitude increment, the setpoint attitude increment defining a rate of change of attitude per time;
(e) downlinking the setpoint attitude increment to a downhole controller;
(f) causing the downhole controller to control the directional drilling tool while drilling in (b) such that a drilling attitude is substantially equal to a setpoint attitude;
(g) adjusting the setpoint attitude by the setpoint attitude increment downlinked in (e); and
(h) continually repeating (f) and (g) to control the curvature of the wellbore while drilling in (b).

* * * * *